(12) United States Patent
Jensen et al.

(10) Patent No.: US 11,930,436 B2
(45) Date of Patent: **\*Mar. 12, 2024**

(54) DATA RELAY FOR MULTI-TENANT EMERGENCY CALL SYSTEM

(71) Applicant: RapidDeploy, Inc., Austin, TX (US)

(72) Inventors: Justin Jensen, Seguin, TX (US); Michael Edwin Kyle, Austin, TX (US)

(73) Assignee: RapidDeploy, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,239

(22) Filed: Jun. 28, 2022

(65) Prior Publication Data
US 2022/0330002 A1 Oct. 13, 2022

Related U.S. Application Data

(63) Continuation of application No. 17/070,400, filed on Oct. 14, 2020, now Pat. No. 11,405,768.

(60) Provisional application No. 62/916,012, filed on Oct. 16, 2019.

(51) Int. Cl.
| | |
|---|---|
| *H04W 4/90* | (2018.01) |
| *H04L 12/66* | (2006.01) |
| *H04L 61/103* | (2022.01) |
| *H04L 69/22* | (2022.01) |

(52) U.S. Cl.
CPC ............ *H04W 4/90* (2018.02); *H04L 12/66* (2013.01); *H04L 61/103* (2013.01); *H04L 69/22* (2013.01)

(58) Field of Classification Search
CPC .......... H04W 4/90; H04W 4/02; H04M 3/42; H04M 3/51; H04L 65/102; H04L 65/1069; H04L 69/22

USPC .......................................................... 379/45
See application file for complete search history.

(56) References Cited

U.S. PATENT DOCUMENTS

| | | | |
|---|---|---|---|
| 6,914,895 B1 * | 7/2005 | Straub | H04J 3/0652 370/402 |
| 6,914,896 B1 * | 7/2005 | Tomalewicz | H04L 41/00 370/352 |
| 8,526,576 B1 * | 9/2013 | Deich | H04M 11/00 370/352 |
| 2004/0190497 A1 * | 9/2004 | Knox | H04M 7/1285 370/352 |
| 2006/0068753 A1 | 3/2006 | Karpen et al. | |
| 2009/0144449 A1 | 6/2009 | Watt | |

(Continued)

OTHER PUBLICATIONS

EPO Supplementary Search Report issued in EP Application No. 20877077.6 dated Oct. 25, 2022; 8 pages.

*Primary Examiner* — Maria El-Zoobi
(74) *Attorney, Agent, or Firm* — Patent Capital Group

(57) ABSTRACT

An emergency call data relay includes a frame buffer and a frame handler. The frame buffer stores data frames received from a central system (e.g., a central CPE host). The data frames include call data associated with an emergency call being handled at a remote system (e.g., a PSAP) connected to the central system. The frame handler receives a data frame from the frame buffer, identifies a remote system handling the emergency call associated with the call data based on a network address in the data frame, extracts the call data from the data frame, and generates an output packet for a data gateway. The output packet has a header indicating a particular data gateway profile associated with the identified remote system handling the emergency call.

10 Claims, 4 Drawing Sheets

(56) References Cited

U.S. PATENT DOCUMENTS

| | | | | |
|---|---|---|---|---|
| 2015/0002665 A1* | 1/2015 | Sentinelli | ............... | H04N 7/188 |
| | | | | 382/103 |
| 2018/0301017 A1* | 10/2018 | Dizengof | ............. | G08B 25/016 |
| 2019/0325227 A1* | 10/2019 | Smith | .................. | H04N 21/631 |

* cited by examiner

DATA RELAY FOR MULTI-TENANT EMERGENCY CALL SYSTEM

CROSS REFERENCE TO RELATED APPLICATIONS

This application claims the benefit of U.S. Provisional Application No. 62/916,012, filed Oct. 16, 2019, and is a continuation of U.S. patent application Ser. No. 17/070,400, filed Oct. 14, 2020, each of which is incorporated by reference in its entirety.

BACKGROUND

Current multi-tenant 9-1-1 call handling solutions have a central customer premise equipment (CPE) host that receives call data, including location information (e.g., Automatic Location Information (ALI)) for 9-1-1 calls, and distributes this call data to remote public safety answering points (PSAPs), where the calls are handled. For example, a single central CPE host system may collect and distribute call data to tens or hundreds of PSAPs across a geographic region. For each call, the CPE host system may select a PSAP to handle the call based on one or more routing rules. The CPE host system then distributes the call data to the selected PSAP. The CPE host system transmits the call data to the selected PSAP remote site using standard interfaces, Internet Protocol (IP) network equipment, and proprietary "CAD router" software. IP network equipment for existing multi-tenant solutions may include an Ethernet switch, RS-232 serial to IP converters, and a Wide-Area Network (WAN) infrastructure to transport data from the 9-1-1 call handling host site to the PSAP remote sites. In current implementations, the PSAP remote sites receive the call data transmitted over the WAN at an ALI or "CAD spill" connection.

PSAPs traditionally used on-premise Computer-Aided Dispatch (CAD) systems to manage the emergency incident. The on-premise CAD systems received, processed, and displayed the call data to telecommunicators handling the calls. Modern cloud-based CAD systems eliminate on-site infrastructure that was typically required at PSAP sites to implement on-premise CAD systems. Instead, modern cloud-based CADs provide CAD capabilities in a Software-as-a-Service (SaaS) model having a central CAD host system that provides interfaces to remote PSAPs. In addition, modern emergency data and mapping solutions can provide location data and other emergency data to telecommunicators via a cloud-based platform. In some current implementations, devices on-site at PSAPs can capture the call data and send it to a cloud server for processing and display to telecommunicators.

SUMMARY

The emergency call data relay described herein captures emergency call data at the central CPE host of a multi-tenant 9-1-1 system and transmits the captured data to a cloud-based server for processing and providing to a telecommunicator, e.g., in a cloud-based CAD or a cloud-based emergency mapping product. This eliminates the need to install an on-site device at each PSAP to capture the emergency call data. Furthermore, in some implementations, the emergency call data relay can eliminate the need to provide individual ALI or "CAD spill" connections to each PSAP. Reducing network and on-site infrastructure increases the reliability of the systems providing vital emergency call data to telecommunicators. In addition, installing a central data relay at the central CPE host is much faster and more efficient than installing data capture devices in tens or hundreds of PSAPs.

In one embodiment, a system for processing emergency call data includes a frame buffer, a frame handler, and an output. The frame buffer stores data frames received from a central emergency call system, where each data frame includes call data that is associated with an emergency call being handled at one of a plurality of remote emergency call handling systems connected to the central emergency call system. The frame handler receives a data frame from the frame buffer, identifies the remote emergency call handling system handling the emergency call associated with the call data based on a network address in the data frame, extracts the call data from the data frame, and generates an output packet. The output packet includes a packet body with the call data and a packet header indicating a data gateway profile associated with the identified remote emergency call handling system. The output is configured to provide the output packet to a data gateway that includes a plurality of data gateway profiles each corresponding to a respective one of the plurality of remote emergency call handling systems.

In another embodiment, a system for processing emergency call data includes a frame buffer, a frame handler, and a data gateway. The frame buffer is configured to store data frames received from a central emergency call system, where each data frame includes call data associated with an emergency call being handled at one of a plurality of remote emergency call handling systems. The frame handler is configured to receive a data frame from the frame buffer, identify the remote emergency call handling system handing the emergency call associated with the call data based on a network address in the data frame, and generate an output packet including the call data, the output packet having a packet header selected based on the identified remote emergency call handling system. The data gateway includes a plurality of data gateway profiles, each data gateway profile associated with one of the plurality of remote emergency call handling systems. Each data gateway profile is configured to receive, from the frame handler, call data associated with the data gateway profile, and transmit at least a portion of the call data to a cloud-based processing system.

Another embodiment provides a method for relaying emergency call data. The method includes receiving a data frame from a central emergency call system, the data frame including call data associated with an emergency call being handled at one of a plurality of remote emergency call handling systems connected to the central emergency call system. The method further includes identifying the remote emergency call handling system handling the emergency call associated with the call data based on a network address in the data frame; extracting the call data from the data frame; and generating an output packet including a packet body and a packet header, where the packet body includes the call data, and the packet header includes a network address of a data gateway profile associated with the identified remote emergency call handling system.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Prior Art Multi-Tenant Call Handling

Figure 1:
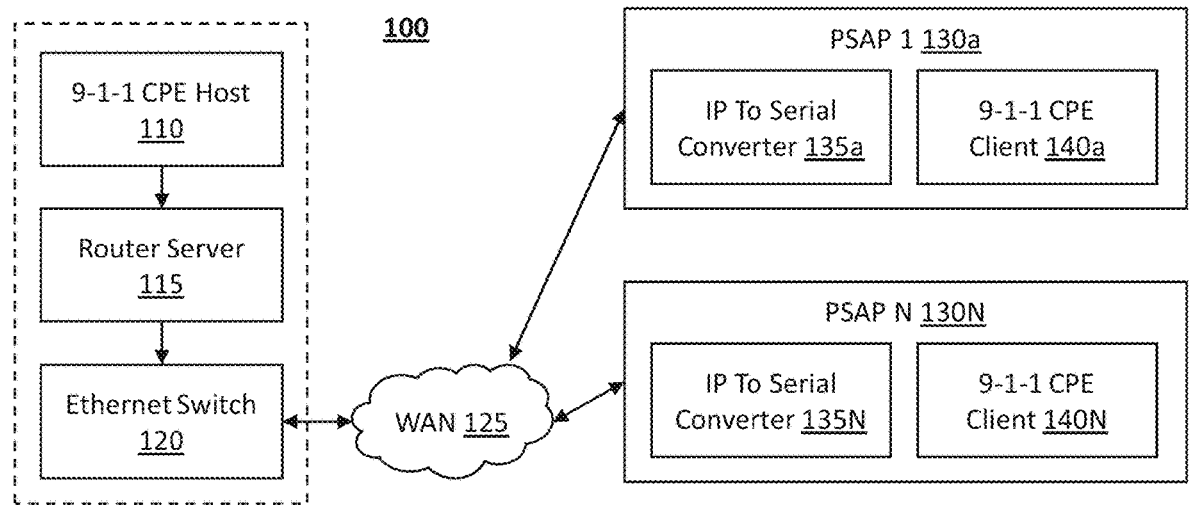
FIG. 1 is a system diagram illustrating a prior art multi-tenant call handling system.

FIG. 1 is a system diagram illustrating a prior art multi-tenant call handling system 100. The system 100 includes a 9-1-1 CPE host 110, a router server 115, and an Ethernet switch 120, which are generally located at a single location, e.g., a building for administering a state or regional emergency call system. The 9-1-1 CPE host 110, router server 115, and Ethernet switch 120 are an example of a central emergency call handling host system, and more generally, an example of a central emergency call system. The router server 115 receives emergency call data from the 9-1-1 CPE host 110, and the router server 115 distributes the call data to individual public safety answering points (PSAPs) 130 over a wide area network (WAN) 125 via the Ethernet switch 120.

A number N of remote PSAPs 130 are connected to the WAN 125; the PSAPs 130 include emergency call handling client systems, also referred to as tenant systems, of the central emergency call handling host system. Each PSAP 130 is an example of a remote emergency call handling system. Two example remote PSAPs 130, PSAP 1 130a and PSAP N 130N, are shown in FIG. 1, but it should be understood that any number of PSAPs 130 may be included in the system 100. Each PSAP 130 includes an IP to serial converter 135 to receive the emergency call data from the WAN 125 and to transfer the emergency call data to a 9-1-1 CPE client 140.

The 9-1-1 CPE host 110 provides call data related to emergency calls. The call data may include location information, such as ALI or a Call Detail Report (CDR). The CPE host 110 may also output network data, such as Voice over IP (VoIP) traffic, network management traffic, and data related to proprietary applications running on the call handling system 100.

The router server 115 receives the call data from the 9-1-1 CPE host 110 and distributes the call data to the PSAPs 130. For a given emergency call, the 9-1-1 CPE host 110 outputs call data to the router server 115. The router server 115 determines which PSAP 130 is handling the emergency call and routes the call data to the appropriate PSAP 130. For example, upon receiving a new emergency call, the router server 115 selects PSAP 1 130a to handle the call based on a location (e.g., a street address or a latitude-longitude) included in the call data falling within a geographic boundary associated with PSAP 1 130a. Upon receiving follow-on call data related to the same call (e.g., additional ALI or CDR data), the router server 115 transmits the follow-on data to PSAP 1 130a handling the call.

Many PSAPs have multiple telecommunicator positions, also referred to as seats, each staffed by a different telecommunicator. In some embodiments, the router server 115 selects a position within the PSAP 130 to handle the call and routes the call data to that position. In other embodiments, after delivering a call to a PSAP 130, the router server 115 receives a message from the PSAP 130 indicating which telecommunicator position is handling the call (e.g., if all telecommunicators within a PSAP 130 receive a notification of an incoming call, and one of the telecommunicators chooses to handle the call). The router server 115 may then route call data to that position.

While the router server 115 and 9-1-1 CPE host 110 are shown as being two devices in FIG. 1, in other implementations, a single device (e.g., a single server) implements the 9-1-1 CPE host 110 and the router server 115, or the functionalities of the 9-1-1 CPE host 110 and router server 115 are carried out using other devices or combinations of devices.

The router server 115 applies a network address (e.g., an IP header) to the call data to route the call data over the WAN 125. The IP header includes an IP address of a device (e.g., the IP to serial converter 135) at the destination PSAP 130. The Ethernet switch 120 transmits Ethernet frames including the applied PSAP IP address in a header and the call data in the body of the frame to the PSAPs 130. A field within the call data frame (e.g., within the body of the IP packet) also includes a position identifier that identifies the position within the PSAP 130 of the telecommunicator handling the call. The position identifier is used at the PSAP 130 to route the call data to the correct position.

The PSAPs 130 are emergency call taking centers. PSAPs typically include telephony infrastructure for receiving emergency calls and related data and for routing the calls and related data to telecommunicators working at the PSAP. PSAPs also include dispatch equipment that telecommunicators use to communicate information about the emergency calls to appropriate first responders (e.g., police, fire, or medical responders). In a multi-tenant call handling system, each PSAP 130 includes an emergency call handling client system. As illustrated in FIG. 1, the emergency call handling client system includes an IP to serial converter 135 that receives the IP packets sent over the WAN 125 and a 9-1-1 CPE client 140 that processes and distributes the call and call data within the PSAP 130. The 9-1-1 CPE client 140 can include various hardware devices, such as servers, routers, and switches, for supporting delivery of emergency calls to telecommunicators. The 9-1-1 CPE client 140 may connect the PSAP 130 to a telephony network (not shown in FIG. 1) and handle and process telephony aspects of emergency calls. The 9-1-1 CPE client 140 may also include routers and telephony switching systems used by telecommunicators to receive calls. In a traditional implementation, the 9-1-1 CPE client 140 may further connect to an on-premise CAD system that receives the call data and displays it to telecommunicators handling calls.

Environment for Data Relay for Emergency Call Data

Figure 2:
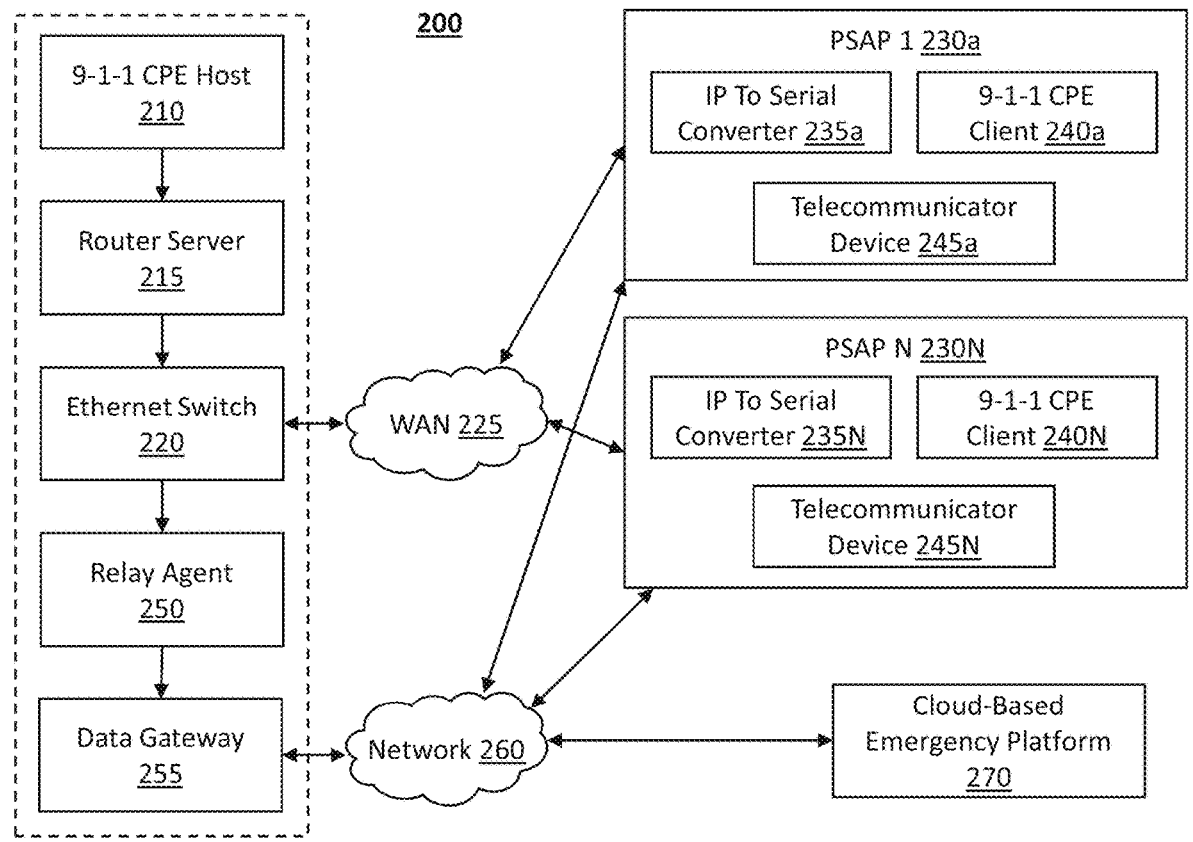
FIG. 2 is a system diagram illustrating a multi-tenant call handling system configured to capture and distribute emergency call data over a cloud platform, according to some embodiments.

FIG. 2 is a system diagram illustrating a multi-tenant call handling system 200 configured to capture and distribute emergency call data over a cloud platform. The system 200 includes a 9-1-1 CPE host 210 and router server 215, which are similar to the 9-1-1 CPE host 110 and router server 115 described above. The system 200 further includes an Ethernet switch 220 that connects the central emergency call handling host system (e.g., the components 210, 215, and 220) to a WAN 225, which is similar to the WAN 125. Functionality of the Ethernet switch 220 is modified relative to the Ethernet switch 120 from FIG. 1. In particular, the Ethernet switch 220 is configured with a mirror port that outputs some or all of the call data transmitted to the PSAPs 230 to a relay agent 250.

The relay agent 250 and data gateway 255 form a data relay for emergency call data. The relay agent 250 receives the mirror call data from the Ethernet switch 220, identifies a PSAP 230 to which the call data is being transmitted, and provides the call data to a data gateway 255. In particular, the relay agent 250 relays the call data to a particular profile running on the data gateway 255 selected based on the identified PSAP 230. The data gateway 255 processes the call data and transmits at least some of the call data over a network 260 to an emergency platform 270. The relay agent 250 and data gateway 255 are described further in detail in relation to FIGS. 3-5. The components 210, 215, 220, 250, and 255 may be located at a single location, e.g., a building for administering a state or regional emergency call system. For example, the relay agent 250 and data gateway 255 are installed at the same location that houses the emergency call handling host system shown in FIG. 1 to set up a data relay for emergency call data.

The cloud-based emergency platform 270 receives call data from the data gateway 255 via the network 260 and processes the received call data. In some embodiments, the cloud-based emergency platform 270 is a cloud-based emergency mapping product that provides caller location data and other caller data (e.g., callback number, name, time stamp, location source, location accuracy, etc.) to telecommunicators responding to emergency calls. In some embodiments, the cloud-based emergency platform 270 further provides a CAD service that enables telecommunicators to connect to first responders and dispatch first responders to the locations of emergencies. The cloud-based emergency platform 270 connects to telecommunicator devices 245 located with the PSAPs 230 to provide user interfaces to telecommunicators (e.g., for mapping or CAD products). For example, the cloud-based emergency platform 270 may provide a web interface to the telecommunicator device 245, e.g., in website accessed by a browser executing on the telecommunicator device 245. The cloud-based emergency platform 270 is implemented by one or more highly secure and reliable servers. For example, the cloud-based emergency platform 270 may operate on the Microsoft Azure Government cloud. An example of a cloud-based emergency platform is described in greater detail with respect to FIG. 6.

The PSAPs 230 each include an emergency call handling client system. In the example shown in FIG. 2, the emergency call handling client system includes an IP to serial converter 235 and 9-1-1 CPE client 240, which are similar to the IP to serial converter 135 and 9-1-1 CPE client 140 described with respect to FIG. 1. Each PSAP 230 further includes a telecommunicator device 245, which is a computer system operated by a telecommunicator on-site at the PSAP 230. The telecommunicator device 245 includes the hardware and software needed to display user interfaces, connect to the network 260, and detect user input. The telecommunicator device 245 includes an application that allows interaction with the cloud-based emergency platform 270, such as a browser that allows the telecommunicator to access a web-based mapping or CAD service provided by the cloud-based emergency platform 270. Alternatively, the application may be a dedicated application that enables interactions with the cloud-based emergency platform 270.

Although one telecommunicator device 245 is shown in each PSAP 230 in FIG. 2, each PSAP 230 may include two or more similar telecommunicator devices 245 based on the number of seats at the PSAP 230. As noted above, the call data frames include a position identifier that identifies the position of the telecommunicator within a PSAP handling a given call. The cloud-based emergency platform 270 may use the position identifier to route call data to a particular telecommunicator device 245.

In some embodiments, other devices outside of a PSAP 230 may access data from the cloud-based emergency platform 270 in a similar manner to the telecommunicator device 245. For example, the cloud-based emergency platform 270 may provide a tactical map to on-scene first responders that includes data received via the relay agent 250 and data gateway 255. As another example, if a given PSAP 230a is experiencing high call volumes, outages, severe weather, or other adverse conditions, additional telecommunicators located at other PSAPs (e.g., PSAP 230N) or other remote locations may access data from the cloud-based emergency platform 270 to assist PSAP 230a.

The network 260 may be an IP-based network over which devices transmit and receive communications using Internet Protocol. The network 260 may include a secure Internet connection to which the data gateway 255 and telecommunicator devices 245 connect to the cloud-based emergency platform 270, such as connection to the Microsoft Azure Government cloud computing platform. In some embodiments, the WAN 225 and network 260 are the same network, e.g., the Internet.

While FIG. 2 shows one example environment in which the relay agent 250 and data gateway 255 may be employed, the relay agent 250 and data gateway 255 may be used in other environments in which data for multiple PSAPs is received at a central emergency call system, either before or after distribution to the PSAPs. As one other example, rather than having a central CPE host system that distributes calls and call data to multiple PSAPs, a set of PSAPs (e.g., a set of PSAPs within a given region or state) each includes a separate call handling system, and each of the PSAPs transmits call data to a central emergency call system for data aggregation. In this type of environment, rather than call data being passed from the central CPE host to the client PSAPs as described above, call data is passed from remote PSAPs to the central data aggregation system. The data aggregation system has an output port (e.g., an Ethernet output provided by an Ethernet switch, or a serial output) that transfers the data received from the PSAPs to the relay agent 250, which relays the data to the data gateway 255 as described herein. A source network address in the Ethernet frames received at the aggregation system may indicate the PSAP from which each call data was received. In other embodiments, the received call data may include a field indicating the PSAP from which the call data was received.

Example Data Relay for Emergency Call Data

Figure 3:
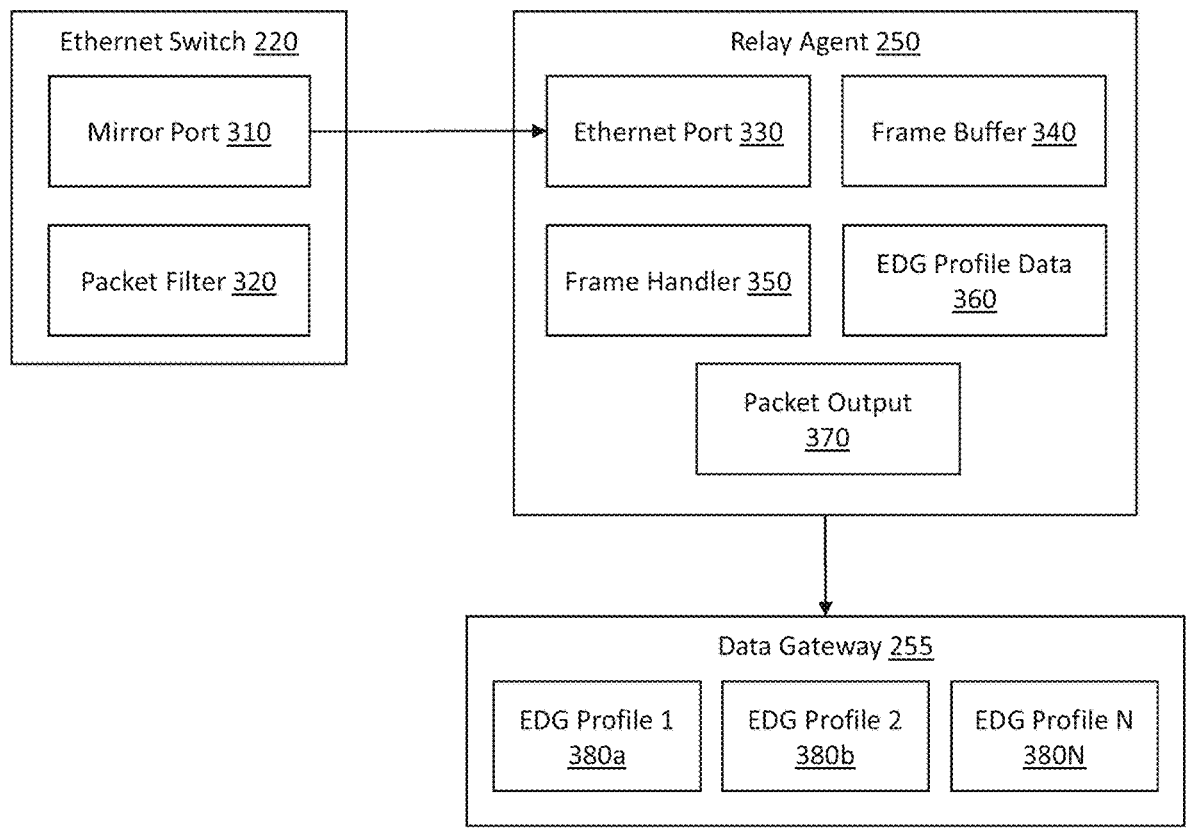
FIG. 3 is a block diagram illustrating the Ethernet switch, relay agent, and data gateway of the system shown in FIG. 2, according to some embodiments.

FIG. 3 is a block diagram illustrating the Ethernet switch 220, the relay agent 250, and the data gateway 255 of the system shown in FIG. 2. The Ethernet switch 220 includes a mirror port 310 and a packet filter 320. The relay agent 250 includes an Ethernet port 330, a frame buffer 340, a frame handler 350, emergency data gateway (EDG) profile data 360, and a packet output 370. The data gateway 255 includes a number N of EDG profiles 380, three of which (EDG profiles 380a, 380b, and 380N) are shown in FIG. 3. Each of the EDG profiles 380a through 380N corresponds to a respective one of the PSAPs 230a through 230N that includes an remote emergency call handling system, as described with respect to FIG. 2. Each of the EDG profiles 380 receives data intended for or received from a particular emergency call handling client system, e.g., EDG profile 1 380a is configured to receive a copy of the data sent to PSAP 1 230a.

As described with respect to FIGS. 1 and 2, in the multi-tenant environment, call data from the router server 215 traverses the Ethernet switch 220 before being routed over the WAN 225 to the PSAPs 230. The Ethernet switch 220 is modified relative to the standard multi-tenant Ethernet switch (e.g., Ethernet switch 120 described with respect to FIG. 1) to output data to the data relay. In particular, a mirror port 310 is configured to output a copy of the frames transmitted by the Ethernet switch 220 to the PSAPs 230. The mirror port 310 may be, for example, a switch port analyzer (SPAN) mirror port or a roving analysis port (RAP). For the embodiment in which the central emergency call system is an aggregation system that receives call data from multiple remote PSAPs, a mirror port 310 or another type of port outputs the Ethernet frames received from the remote PSAPs.

In some embodiments, the mirror port 310 transmits a copy of all of the Ethernet frames sent out from or received at the Ethernet switch 220, e.g., all of the data transmitted by the router server 215 in the environment shown in FIG. 2. In other embodiments, the Ethernet switch 220 includes a packet filter 320 that filters out selected packets from being sent out of the mirror port 310 based on the packets' contents. For example, the packet filter 320 may send ALI and CDR packets to the mirror port 310, while filtering out network management traffic, VoIP traffic, proprietary application traffic, and/or other types of packets. In other embodiments, the specific types of data that are filtered or transmitted may be different. The packet filter 320 may inspect a data type in the header and/or inspect the data in the packet body to determine the data type.

The Ethernet port 330 of the relay agent 250 receives the Ethernet frames output by the mirror port 310 of the Ethernet switch 220 and passes the Ethernet frames to the frame buffer 340. The frame buffer 340 temporarily stores the Ethernet frames before they are processed. The frame buffer 340 is implemented in a memory or a portion of a memory of the data gateway 255. The frame buffer 340 may be implement a first in, first out (FIFO) queue, so that the Ethernet frames are processed in the order they are received.

A frame handler 350 receives a data frame from the frame buffer 340 and generates an output packet for the data gateway 255 that includes data (e.g., call data) from the data frame. The frame handler 350 identifies the remote emergency call handling system handling the call associated with the call data (e.g., the emergency call handling client system to which the data frame was transmitted over the WAN 225) based on a network address in the data frame. For example, if a data frame includes a destination network address for the 9-1-1 CPE client 240a, the frame handler 350 extracts this destination network address from the frame. In some embodiments, the frame handler 350 extracts a source network address rather than the destination address, e.g., if each PSAP transmits call data to a central emergency call data aggregator where the relay agent 250 and data gateway 255 are implemented. In still other embodiments, the frame handler 350 extracts data identifying the remote emergency call handling system based on other data, e.g., a data field in the call data specifying a PSAP.

The EDG profile data 360 stores data associating remote emergency call handling systems to network addresses of EDG profiles 380 on the data gateway 255. For example, the frame handler 350 looks up the extracted network address from a data frame in the EDG profile data 360. In the environment shown in FIG. 2, if a data frame is transmitted to the network address for 9-1-1 CPE client 240a in PSAP 230a, the frame handler 350 queries the EDG profile data 360 with this network address, and the EDG profile data 360 returns a network address (e.g., an IP address and port) for EDG profile 1 380a. The frame handler 350 generates an output packet, e.g., an IP packet, with a body and a header. The header indicates the network address of the EDG profile associated with the remote emergency call handling system. The body includes the data from the data frame, e.g., the call data.

The data gateway 255 includes a set of emergency data gateway (EDG) profiles 380a through 380N. Each of the EDG profiles 380 receives data associated with a particular PSAP 230. The EDG profile 380 parses the data in the output data format used at the central emergency call system (e.g., the output format of the 9-1-1 CPE host 210) and formats the parsed data into a consistent data format recognized by the cloud-based emergency platform 270. The EDG profile 380 then forwards the formatted data to the cloud-based emergency platform 270 for further processing and display to a telecommunicator at the relevant PSAP 230. An example EDG profile 380 is described further in relation to FIG. 5.

The EDG profile data 360 associating the network addresses of remote emergency call handling systems to the EDG profiles 380 may be compiled during a configuration of the relay agent 250 and the data gateway 255. For example, an administrator configures the data gateway 255 to include an EDG profile 380 associated with each of the remote emergency call handling systems. During configuration, the association between the network address of each EDG profile 380 and the network address of its corresponding remote emergency call handling system is stored in the EDG profile data 360, so that call data can be routed to the proper EDG profile 380. When changes are made to the multi-tenant call handling system 200, e.g., if a PSAP 230 is added or removed from the system 200, the EDG profiles 380 and EDG profile data 360 are updated to reflect the system changes.

In some embodiments, the relay agent 250 and data gateway 255 are implemented across multiple distinct devices. For example, the relay agent 250 is implemented on a relay device that includes an Ethernet port 330, one or more memories for implementing the frame buffer 340 and storing the EDG profile data 360, and processing circuitry for implementing the frame handler 350. The packet output 370 is an output of the relay device that is physically connected to an input port of a data gateway 255. In this embodiment, the data gateway 255 is a gateway device that is configured to implement multiple EDG profiles 380. The gateway device includes a data input for receiving packets from the relay agent 250, a network interface for communicating with the cloud-based emergency platform 270 via the network 260, and processing circuitry for processing the data received from the relay agent 250. An example gateway device is described in relation to U.S. Pat. No. 10,264,122, which is incorporated herein in its entirety. In some examples, multiple gateway devices are used to implement the EDG profiles 380, e.g., a first gateway device implementing 50 EDG profiles, a second gateway device implementing another 50 EDG profiles, etc.

In other embodiments, the relay agent 250 and data gateway 255 are implemented on a single integrated device. For example, the relay agent 250 is implemented by a network interface controller (NIC) of a gateway device that implements the EDG profiles 380. The NIC includes an Ethernet port 330, one or more memories for implementing the frame buffer 340 and storing the EDG profile data 360, and processing circuitry for implementing the frame handler 350. The NIC outputs IP packets with call data to a data bus of the gateway device, which distributes the IP packets to the EDG profiles 380.

If a 9-1-1 system has more EDG profiles 380 than can be implemented by a gateway device, multiple gateway devices implementing different sets of EDG profiles 380 may be connected to the Ethernet switch 220 and each receive the mirror port data. Each gateway device may filter the received mirror port data for call data related to the EDG profiles 380 implemented by the gateway device.

In alternative configurations, different and/or additional components may be included in any of the Ethernet switch 220, the relay agent 250, and the data gateway 255. Furthermore, the functionality described in conjunction with one or more of the components shown in FIG. 3 may be distributed among the components in a different manner than described. For example, while the Ethernet switch 220 is shown as including a packet filter 320, the relay agent 250 and/or the data gateway 255 may additionally or alternatively include a filtering mechanism, e.g., the data filter 420 described with respect to FIG. 4.

Example Frame Handler

Figure 4:
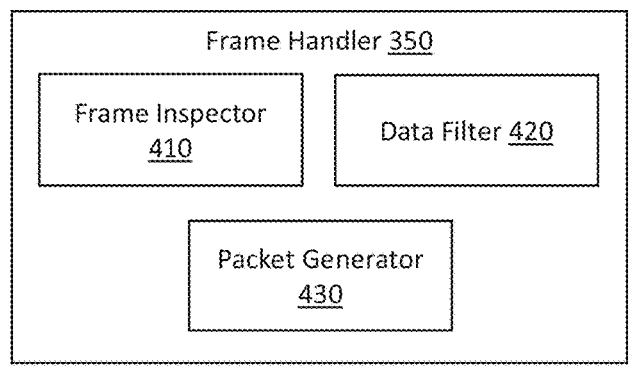
FIG. 4 is a block diagram of a frame handler of the relay agent shown in FIG. 3, according to some embodiments.

FIG. 4 is a block diagram of a frame handler 350 of the relay agent 250 shown in FIG. 3, according to some embodiments. The frame handler 350 includes a frame inspector 410, a data filter 420, and a packet generator 430. In alternative configurations, different and/or additional components may be included in the frame handler 350 from those shown in FIG. 4. Furthermore, the functionality described in conjunction with one or more of the components shown in FIG. 4 may be distributed among the components in a different manner than described.

The frame inspector 410 extracts the network address or other data identifying the remote emergency call handling system from the Ethernet frame received from the frame buffer 340. For example, the Ethernet frame includes a destination network address that indicates the PSAP 230 to which the frame is being sent, e.g., an IP address of the IP to serial converter 235a. The frame inspector 410 extracts this destination network address from the Ethernet frame. In some embodiments, the frame inspector 410 also determines a data type describing the data included in the body of the Ethernet frame. For example, in addition to call data, the emergency call handling host system may transmit network management traffic, VoIP traffic, proprietary application traffic, and/or other types of data over the Ethernet switch. The frame inspector 410 may determine a type of data provided in a frame based on one or more factors. For example, the frame inspector 410 may inspect a header identifying the data type. As another example, the frame inspector 410 determines a length of the data block, with different lengths associated with different data types.

The data filter 420 filters the frames based on the data type determined by the frame inspector 410. For example, the data filter 420 discards any frames that do not include call data. In another example, the data filter 420 discards frames that do not include call data or network management traffic. In some embodiments, the data filter 420 is not included in the frame handler 350, e.g., if the Ethernet switch 220 implements a packet filter 320, or if all data received at the relay agent 250 is transmitted to the cloud-based emergency platform 270.

The packet generator 430 generates an output packet based on the data frame and the identified network address. The packet generator 430 looks up a network address (e.g., IP address and port) of an EDG profile 380 associated with the identified remote emergency call handling system in the EDG profile data 360, as described with respect to FIG. 3. The packet generator 430 generates an output packet that includes the data block extracted from the Ethernet frame as the packet body and the IP address for the appropriate EDG profile 380 in the packet header. The packet generator 430 passes the output packet to the packet output 370 of the relay agent 250.

Example EDG Profile

Figure 5:
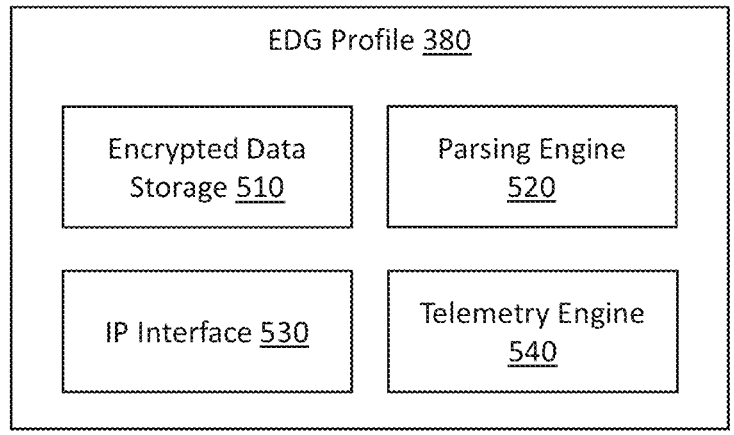
FIG. 5 is a block diagram showing an example emergency data gateway profile implemented on the data gateway of FIG. 3, according to some embodiments.

FIG. 5 is a block diagram of an EDG profile 380, according to some embodiments. The EDG profile 380 includes encrypted data storage 510, a parsing engine 520, an IP interface 530, and a telemetry engine 540. In alternative configurations, different and/or additional components may be included in the EDG profile 380 from those shown in FIG. 5. Furthermore, the functionality described in conjunction with one or more of the components shown in FIG. 5 may be distributed among the components in a different manner than described.

The encrypted data storage 510 is a memory local to the data gateway 255 that stores packets received from the relay agent 250 directed to the EDG profile 380 (e.g., call data packets with the destination IP address for EDG profile 1 380a). The encrypted data storage 510 may store the packets in a queue based on time of arrival at the data gateway 255. In some embodiments, the encrypted data storage 510 comprises a portion of a memory, with different EDG profiles 380 storing packets in different portions of the memory. In other embodiments, each EDG profile 380 has a dedicated memory or dedicated block of memory. The encrypted data storage 510 stores data in an encrypted format to provide data security.

The parsing engine 520 retrieves data packets from the encrypted data storage 510, parses the data according to instructions for parsing the data from the data output format of the 9-1-1 CPE host 210, and formats the parsed data in a consistent format. If the data packets are stored in a queue, the parsing engine 520 may retrieve data from the queue in a first-in-first-out (FIFO) order, so that data is processed in the order that it is received. Call data across different CPE systems typically include similar types of data, but the call data may be encoded and formatted differently by different CPE systems. So, while the 9-1-1 CPE host 210 may generate call data in a consistent format across the multi-tenant call handling system 200, the cloud-based emergency platform 270 may receive data from a variety of call handling systems (e.g., various single tenant call handling systems and various multi-tenant call handling systems) that generate call data with different formats. The parsing engine 520 identifies and classifies parts of each call data packet based on the encoding and formatting of the call data, e.g., the encoding format of the 9-1-1 CPE host 210 or another data source. The parsing engine 520 then recombines the parsed data to form a data message having a consistent format that is recognized and understood by the cloud-based emergency platform 270. Each data message in the consistent format output by the parsing engine 520 includes an identifier of the PSAP 230 handling the call, i.e., an identifier of the PSAP 230 corresponding to the EDG profile 380. Each data message also includes an identifier of the telecommunicator position to which the call associated with the data is routed.

As an example, call data in the Automatic Location Identification (ALI) format, which is one format used by some CPE systems, is provided below. This format does not indicate the fields for the various components, so this data cannot be interpreted and analyzed unless the receiving device is specifically configured to parse data in the ALI format.

```
265
H1-000              ESN=080              001
(123) 456-7890 12:00 01/01/2018
  100
MAIN ST
                    123-4567 RESD
AUSTIN                                   TX
DOE,JOHN
ALT#=               TELCO=SWBT
X=+30.263675        CNF=
Y=-97.725412        UNC:
AUSTIN PD
AUSTIN FD
```

An example of a reformatted data message in JSON (JavaScript Object Notation) format output by the parsing engine 520 is provided below. The JSON format indicates the fields for each item in the data message, so the data message provided by the EDG profile 380 can be easily understood and analyzed at the cloud-based emergency platform 270.

```
{
    "ContactNumber": "1234567890",
    "City": "AUSTIN",
    "ClassOfService": "RESD",
    "StreetNumber": "100",
    "Latitude": "+30.263675",
    "Longitude": "-97.725412",
    "ContactName": "DOE,JOHN",
    "State": "TX",
    "Street1": "MAIN ST",
    "SourceDateTime": "2018-01-01 12:00:00Z",
    "Telco": "SWBT"
}
```

As noted above, in some embodiments, the relay agent 250 receives network management data and/or other types of data other than call data and passes this data to the data gateway 255. The parsing engine 520 or another component of the EDG profile 380 (e.g., the telemetry engine 540 or another module) may be configured to parse and reformat the network management data, or to pass the network management data as received to the cloud-based emergency platform 270 for analysis and reporting.

The IP interface 530 communicates with the cloud-based emergency platform 270 over the network 260. The IP interface 530 may be a single interface that is shared by multiple EDG profiles 380 executing on the data gateway 255. The IP interface 530 receives formatted data messages from the parsing engine 520 and transmits these formatted messages to the cloud-based emergency platform 270 over the network 260. In particular, the IP interface 530 may connect to an event hub of the cloud-based emergency platform 270 that is configured to receive formatted call data messages from data gateways. The IP interface 530 also receives data from the cloud-based emergency platform 270, such as configuration information and software updates. In addition, the telemetry engine 540 uses the IP interface 530 to communicate with the cloud-based emergency platform 270 as described below.

The telemetry engine 540 provides status updates to the cloud-based emergency platform 270 regarding the relay agent 250, data gateway 255, and/or other components of the multi-tenant call handling system 200 (e.g., the 9-1-1 CPE host 210, the router server 215, the 9-1-1 CPE clients 240). For example, the telemetry engine 540 calculates metrics describing operations of each EDG profile 380, e.g., number of data messages received, number of data messages processed, processing time, queue size, etc., and transmits the metrics to the cloud-based emergency platform 270 via the IP interface 530. As another example, the telemetry engine 540 monitors connectivity and functionality of the 9-1-1 CPE host 210 and/or 9-1-1 CPE clients 240 in the multi-tenant call handling system 200. The telemetry engine 540 may be configured to detect errors in the connectivity and/or functionality of the CPE host and clients 210 and 240 and transmit alerts to the cloud-based emergency platform 270. In some embodiments, the telemetry engine 540 receives and processes network management data. The cloud-based emergency platform 270 can update the telecommunicator or an administrator at a PSAP 230 or an administrator at the host site so that they can quickly address any issues with the system.

Example Cloud-Based Emergency Platform

Figure 6:
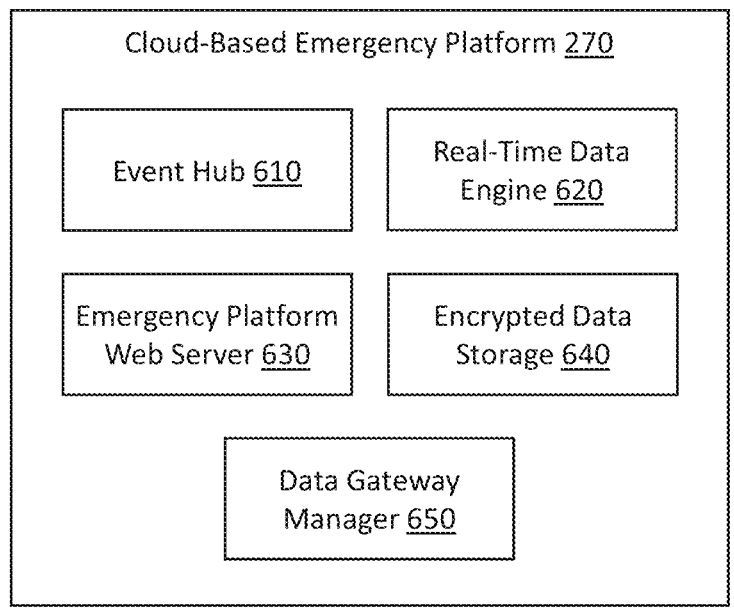
FIG. 6 is a block diagram showing a cloud-based emergency platform, according to some embodiments.

FIG. 6 is a block diagram of the cloud-based emergency platform 270, according to some embodiments. The cloud-based emergency platform 270 includes an event hub 610, a real-time data engine 620, an emergency platform web server 630, an encrypted data storage 640, and a data gateway manager 650. In alternative configurations, different and/or additional components may be included in the cloud-based emergency platform 270. Additionally, functionality described in conjunction with one or more of the components shown in FIG. 6 may be distributed among the components in a different manner than described in conjunction with FIG. 6 in some embodiments.

The event hub 610 receives and processes data messages describing call events from a set of data gateways, such as data gateway 255, connected to the cloud-based emergency platform 270 via the network 260. In one embodiment, the data gateway 255 is configured to transmit different types of data messages, such as the real-time messages with call data as described above, and data messages that provide summary information describing one or more calls. In this embodiment, the event hub 610 determines the message type, e.g., based on a flag, or based on the formatting of the message. The event hub 610 then routes each data message based on its message type. For example, the event hub 610 routes real-time messages to the real-time data engine 620, and routes summary data to a separate analytics engine (not shown in FIG. 6). The event hub 610 also routes data messages to the encrypted data storage 640, from which the analytics engine may retrieve the data for analysis.

The real-time data engine 620 performs real-time processing of data messages during an emergency call. The real-time data engine 620 parses the data messages, including extracting the telecommunicator position, the location information, caller phone number, caller name, and other available information. The real-time data engine 620 may retrieve additional data about the call or the caller as available based on the extracted data. For example, the real-time data engine 620 may retrieve additional location information, information about previous calls, medical history information, etc. from the encrypted data storage 640 or other data sources. The real-time data engine 620 provides data about the caller that may be used by the telecommunicator to the emergency platform web server 630.

The emergency platform web server 630 is a web server that provides user interfaces for assisting in emergency response, such as a mapping interface, a call-taking interface, and/or a dispatch interface, to the telecommunicator devices 245. As described with respect to FIG. 2, the telecommunicator devices 245 may execute a browser that accesses a website provided by the emergency platform web server 630. The emergency platform web server 630 maintains information identifying each telecommunicator accessing the cloud-based emergency platform 270, such as a PSAP identifier and the position number within the PSAP. The emergency platform web server 630 routes data received from the real-time data engine 620 to the appropriate telecommunicator by matching the PSAP identifier and position number extracted from the data messages to the PSAP identifier and position number of the telecommunicator device 245 used by the telecommunicator to which the router server 215 routed the call.

The encrypted data storage 640 provides long term storage of the data messages for analysis of the call event data. The encrypted data storage 640 may include one or more of a Binary Large OBject (BLOB) storage service, data warehouse, key-value database, document database, relational database, or any other type of data storage. In some embodiments, call event data is stored in multiple different databases, which are used for different types of analysis. For example, the event hub 610 may store real-time data in one database of the encrypted data storage 640, and store summary data in a different database of the encrypted data storage 640.

The data gateway manager 650 manages configuration, updating, and maintenance of gateway devices, such as data gateway 255, connected to the cloud-based emergency platform 270. The data gateway manager 650 may assist in configuring the EDG profiles 380 of the data gateway 255. For example, during initial configuration process, the data gateway manager 650 may select parsing instructions based the data output format of the router server 215 and transmit the selected parsing instructions to the data gateway 255. In some embodiments, the data gateway manager 650 also transmits formatting instructions along with the parsing instructions, and/or other instructions used by the EDG profiles 380 during operation. The data gateway manager 650 may store other data describing the data gateway 255 and/or PSAPs 230, such as the telecommunicator positions in the PSAP 230, and reference this information during call events.

After initial configuration, the data gateway manager 650 may send periodic software updates to the data gateway 255 and/or the relay agent 250. In addition, the data gateway manager 650 may monitor the connected data gateways 255, or EDG profiles 380, for status updates. For example, the data gateway manager 650 may receive various alerts provided by the telemetry engines 540 of the EDG profiles 380 regarding the health of the data gateway 255 and upstream devices. The data gateway manager 650 provides passes these alerts to the appropriate administrators within the multi-tenant call handling system, or other authorized administrators or agencies.

Example Process of Capturing and Relaying Emergency Call Data

Figure 7:
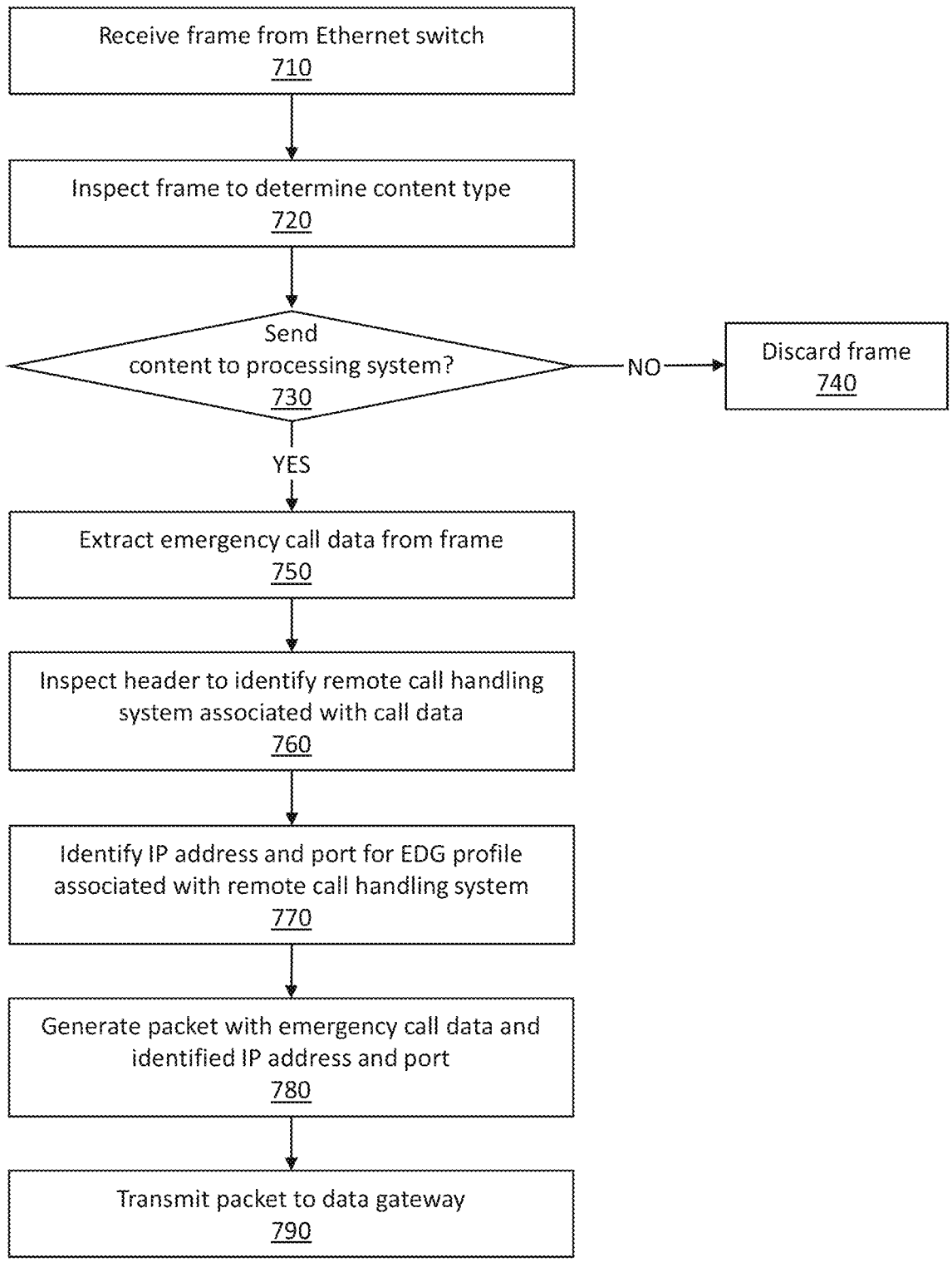
FIG. 7 is a flowchart showing a process of capturing and relaying emergency call data from a multi-tenant call handling system, according to some embodiments.

FIG. 7 is a flowchart showing a process of capturing and relaying emergency call data from a multi-tenant call handling system, according to some embodiments. A relay agent receives 710 a frame from an Ethernet switch. For example, the relay agent 250 receives an Ethernet frame with call data from the Ethernet switch 220.

The relay agent inspects 720 the frame to determine the content type. For example the relay agent 250 inspects the header, frame length, frame contents, or other aspects of the frame to identify the content type, e.g., call data, network management data, VoIP traffic, etc. The relay agent determines 730 whether to send the frame content to a processing system, e.g., to the cloud-based emergency platform 270, based on the type of data. If the relay agent determines not to send the content, the relay agent discards 740 the frame. If the relay agent determines to send the content, the relay agent proceeds to step 750. In some embodiments, steps 720-740 are omitted, e.g., if the Ethernet switch implements a filter, or if all data received at the relay agent 250 is passed to the cloud-based emergency platform 270. In still other embodiments, filtering is performed at the data gateway 255.

The relay agent extracts 750 emergency call data from the received Ethernet frames containing data to be passed to the data gateway 255 (i.e., the call data from the frames that were not discarded, if the relay agent 250 implements a filter). The relay agent inspects 760 the header of the Ethernet frame to identify a remote call handling system associated with the call data, e.g., the remote call handling system handling the emergency call to which the call data is related. For example, the relay agent 250 extracts the IP address of the remote call handling system from a header of the Ethernet frame.

The relay agent identifies 770 an IP address and port for an EDG profile that is associated with the remote call handling system handling the call. As noted above, each EDG profile 380 is associated with a respective one of the remote call handling systems implemented at the PSAPs 230. The relay agent generates 780 a packet with the extracted emergency call data in the body and the identified IP address and port for the EDG profile in the packet header. The relay agent transmits 790 the generated packet to a data gateway implementing the EDG profiles.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a gateway device. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A method for relaying emergency call data by a system for processing emergency call data, comprising:
    receiving a data frame from a central emergency call system, the data frame comprising call data associated with an emergency call being handled at one of a plurality of remote emergency call handling systems connected to the central emergency call system;
    identifying the remote emergency call handling system handling the emergency call associated with the call data based on a network address in the data frame;
    extracting the call data from the data frame;
    generating an output packet comprising a packet body and a packet header, the packet body comprising the call data, and the packet header comprising a network address of a data gateway profile associated with the identified remote emergency call handling system; and
    based on the data gateway profile, parsing the call data, extracting a plurality of data fields from the call data, and generating a formatted data message for transmission to the cloud-based processing system.

2. The method of claim 1, further comprising transmitting the output packet to a data gateway comprising a plurality of data gateway profiles each corresponding to a respective one of the plurality of remote emergency call handling systems.

3. The method of claim 2, further comprising mirroring data frames to the plurality of remote emergency call handling systems.

4. The method of claim 1, further comprising:
    determining a type of data provided in each of a plurality of data frames received from the central emergency call system; and
    discarding a portion of the plurality of data frames based on the determined type of data.

5. The method of claim 1, wherein the network address in the data frame comprises an Internet Protocol (IP) address of the remote emergency call handling system, and the network address of a data gateway profile comprises an IP address of the data gateway profile.

6. The method of claim 1, wherein the method is performed by a frame buffer and a frame handler of the system for processing emergency call data, wherein the frame buffer receiving the data frame and the frame handler and the frame handler identifies the remote emergency call handling system, extracts the call data, and generates the output packet.

7. A method for processing emergency call data comprising:
    storing, by a frame buffer, data frames received from a central emergency call system, each data frame comprising call data associated with an emergency call being handled at one of a plurality of remote emergency call handling systems;
    receiving, by a frame handler, a data frame from the frame buffer;
    identifying, by the frame handler, the remote emergency call handling system handing the emergency call associated with the call data based on a network address in the data frame;
    generating, by the frame handler, an output packet comprising the call data, the output packet having a packet header selected based on the identified remote emergency call handling system;
    receiving, from the frame handler by a data gateway, call data associated with a data gateway profile associated with one of the plurality of remote emergency call handling systems;
    transmitting, by the data gateway, at least a portion of the call data to a cloud-based processing system; and
    based on the data gateway profile, parsing the call data, extracting a plurality of data fields from the call data, and generating a formatted data message for transmission to the cloud-based processing system.

8. The method of claim 7, further comprising, determining, by the frame handler, a type of data provided in each data frame received from the central emergency call system, and discarding, by the frame handler, a portion of the stored data frames based on the determined type of data.

9. The method of claim 7, wherein the frame buffer and frame handler are implemented on an Ethernet network interface controller (NIC) of a gateway device.

10. The method of claim 7, further comprising:
    storing, by the frame buffer, data frames comprising network event data describing the central emergency call system; and
    generating, by the frame handler, an output packet comprising the network event data.

* * * * *